United States Patent
Ito et al.

(10) Patent No.: US 12,384,452 B2
(45) Date of Patent: Aug. 12, 2025

(54) STEERING CONTROL DEVICE AND ELECTRIC POWER STEERING DEVICE

(71) Applicant: TOYOTA JIDOSHA KABUSHIKI KAISHA, Toyota (JP)

(72) Inventors: Ryosuke Ito, Susono (JP); Ryusuke Masumoto, Toyota (JP); Kimiaki Ono, Shizuoka-ken (JP); Hayato Yoshino, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 387 days.

(21) Appl. No.: 17/840,732

(22) Filed: Jun. 15, 2022

(65) Prior Publication Data
US 2023/0034588 A1  Feb. 2, 2023

(30) Foreign Application Priority Data

Jul. 29, 2021 (JP) ................................. 2021-124502

(51) Int. Cl.
  *B62D 6/00*  (2006.01)
(52) U.S. Cl.
  CPC .................... *B62D 6/002* (2013.01)
(58) Field of Classification Search
  CPC ....... B62D 6/002; B62D 6/008; B62D 15/025
  USPC ......................................................... 701/41
  See application file for complete search history.

(56) References Cited

U.S. PATENT DOCUMENTS

| | | | | |
|---|---|---|---|---|
| 6,360,151 | B1 * | 3/2002 | Suzuki ................... | B62D 5/046 |
| | | | | 318/432 |
| 2005/0273234 | A1 | 12/2005 | Rattapon et al. | |
| 2010/0228440 | A1 * | 9/2010 | Yamazaki ............. | B62D 6/008 |
| | | | | 701/41 |
| 2016/0090120 | A1 * | 3/2016 | Yang .................... | B62D 5/0463 |
| | | | | 701/41 |
| 2023/0101263 | A1 * | 3/2023 | Suzuki .................. | H02P 27/06 |
| | | | | 701/41 |

FOREIGN PATENT DOCUMENTS

| | | | | |
|---|---|---|---|---|
| CN | 108674482 A | * | 10/2018 | ............ B62D 5/046 |
| JP | 2005343302 A | * | 12/2005 | ............... B62D 1/28 |
| JP | 2009-126244 A | | 6/2009 | |
| JP | 2021-28203 A | | 2/2021 | |

* cited by examiner

*Primary Examiner* — Tiffany P Young
*Assistant Examiner* — Shien Ming Chou
(74) *Attorney, Agent, or Firm* — Sughrue Mion, PLLC

(57) ABSTRACT

A steering control device that controls steering of a vehicle in which automatic driving or driving assistance is performed includes a reference steering angle calculation unit that calculates a reference steering angle of the vehicle based on a target steering angle and a vehicle speed of the vehicle, and a compensation unit that determines whether a deviation between the calculated reference steering angle and the target steering angle is equal to or greater than a predetermined value, and when determination is made that the deviation is equal to or greater than the predetermined value, compensates for the calculated reference steering angle such that the calculated reference steering angle follows the target steering angle.

8 Claims, 14 Drawing Sheets

STEERING CONTROL DEVICE AND ELECTRIC POWER STEERING DEVICE

CROSS-REFERENCE TO RELATED APPLICATION

This application claims priority to Japanese Patent Application No. 2021-124502 filed on Jul. 29, 2021, incorporated herein by reference in its entirety.

BACKGROUND

1. Technical Field

The present disclosure relates to a technical field of a steering control device that performs steering control such that torque does not suddenly fluctuate by compensating for friction of a steering mechanism during automatic driving or driving assistance of a vehicle, and an electric power steering device including the steering control device.

2. Description of Related Art

As a steering control device of this type, the steering control device that compensates for the friction of the steering mechanism when driving of a vehicle is assisted has been proposed (see Japanese Unexamined Patent Application Publication No. 2005-343302 (JP 2005-343302 A)).

SUMMARY

However, according to JP 2005-343302 A, there is a technical problem that required torque for target lateral acceleration suddenly fluctuates by the amount of hysteresis, causing an adverse effect on steering feeling when the increasing and decreasing direction of the target lateral acceleration is switched from the increasing direction to the decreasing direction or the decreasing direction to the increasing direction.

The present disclosure has been made in view of the above technical problem, for example, and an issue of the present disclosure is to provide a steering control device capable of suppressing sudden fluctuation in required torque even when the increasing and decreasing direction of the target lateral acceleration is switched from the increasing direction to the decreasing direction or the decreasing direction to the increasing direction in a vehicle in which automatic driving or driving assistance is performed, and an electric power steering device including the steering control device.

One aspect of a steering control device according to the present disclosure is a steering control device that controls steering of a vehicle in which automatic driving or driving assistance is performed in order to solve the above issue, and includes a reference steering angle calculation unit that calculates a reference steering angle of the vehicle based on a target steering angle and a vehicle speed of the vehicle, and a compensation unit that determines whether a deviation between the calculated reference steering angle and the target steering angle is equal to or greater than a predetermined value, and when determination is made that the deviation is equal to or greater than the predetermined value, compensates for the calculated reference steering angle such that the calculated reference steering angle follows the target steering angle.

One aspect of an electric power steering device according to the present disclosure includes, in order to solve the above issue, one aspect of the steering control device according to the present disclosure described above, and an electric actuator of which required torque is controlled based on the compensated reference steering angle by the steering control device.

With one aspect of the steering control device according to the present disclosure, the reference steering angle of the vehicle is calculated by the reference steering angle calculation unit based on the target steering angle according to the direction in which the vehicle is to travel by automatic driving or driving assistance and the vehicle speed of the vehicle. Subsequently, when the compensation unit first determines whether the deviation between the calculated reference steering angle ($\theta_r$) and the target steering angle ($\theta$) is equal to or greater than the predetermined value ($\Delta$), and determines that the deviation is equal to or greater than the predetermined value ($\Delta$), the calculated reference steering angle ($\theta_r$) is compensated and follows the target steering angle ($\theta$). That is, in this case, due to compensation, the reference steering angle follows the target steering angle ($\theta$) so as to be separated by the predetermined value ($\Delta$) or smaller. As a result, even when the increasing and decreasing direction of the target lateral acceleration is switched from the increasing direction to the decreasing direction or the decreasing direction to the increasing direction, it is possible to suppress sudden fluctuation in the required torque based on the compensated reference steering angle ($\theta_r$).

With one aspect of the electric power steering device according to the present disclosure, since the electric power steering device includes the one aspect of the steering control device according to the present disclosure described above, it is possible to suppress sudden fluctuation in the required torque during automatic driving or driving assistance.

Such an action and effect according to the present disclosure will be further clarified by the embodiment of the disclosure described below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

A first embodiment of an electric power steering device including a steering control device according to the present disclosure will be described with reference to FIGS. 1 to 11A and 11B. It is premised that the electric power steering device in the first embodiment is provided in a vehicle in which automatic driving or driving assistance is performed.

Figure 1:
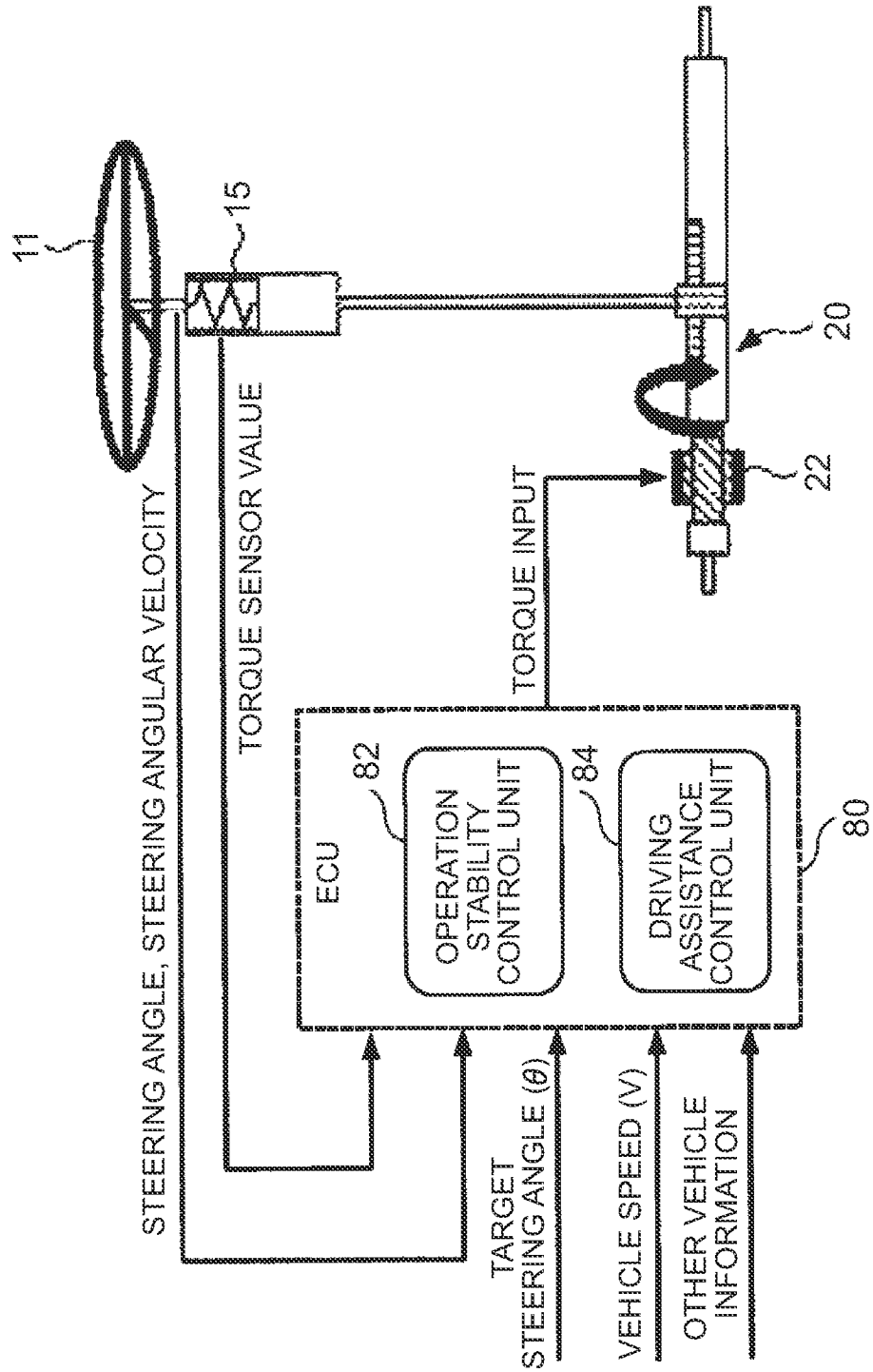
FIG. 1 is a block diagram showing an overall configuration of an electric power steering device for a vehicle according to a first embodiment.

As shown in FIG. 1, the electric power steering device includes a steering wheel 11, a torque sensor 15, a steering mechanism 20, an electric actuator 22, and an electronic control unit (ECU) 80 including an operation stability control unit 82 and a driving assistance control unit 84.

The steering wheel 11 is appropriately steered by a driver while driving assistance or automatic driving is performed, or is rotated with the driver's hands free, and a steering angle and a steering angular velocity are output to the ECU 80. The torque sensor 15 is a sensor that measures torque applied to the steering wheel 11 when the steering wheel 11 is operated or rotated, and a torque sensor value that is a measurement result is output to the ECU 80.

The electric actuator 22 includes an assist motor or a rotation motor, and rotates in response to the torque input from the ECU 80. The steering mechanism 20 includes a steering rack, and is configured to perform steering operation in automatic driving or driving assistance by the torque applied from the electric actuator 22 and the steering wheel 11.

The ECU 80 includes a controller or a processor, various memories, and the like, and the operation stability control unit 82 and the driving assistance control unit 84 are built in the ECU 80 in terms of hardware or software. A target steering angle θ, a vehicle speed V, and other vehicle information (for example, lateral acceleration, yaw rate, etc.) indicating various situations or states of the vehicle are input to the ECU 80. The operation stability control unit 82 is configured to perform the existing operation stability control based on the information input to the ECU 80 as described above. The driving assistance control unit 84 is configured to calculate and output target torque after compensation based on a reference steering angle such that the reference steering angle follows the target steering angle using the target steering angle θ, the vehicle speed V, and the other vehicle information as the input, and set the target torque to the torque input to the electric actuator 22 (that is, a signal indicating required torque). Here, the driving assistance control unit 84 will be described in detail with reference to FIG. 2

Figure 2:
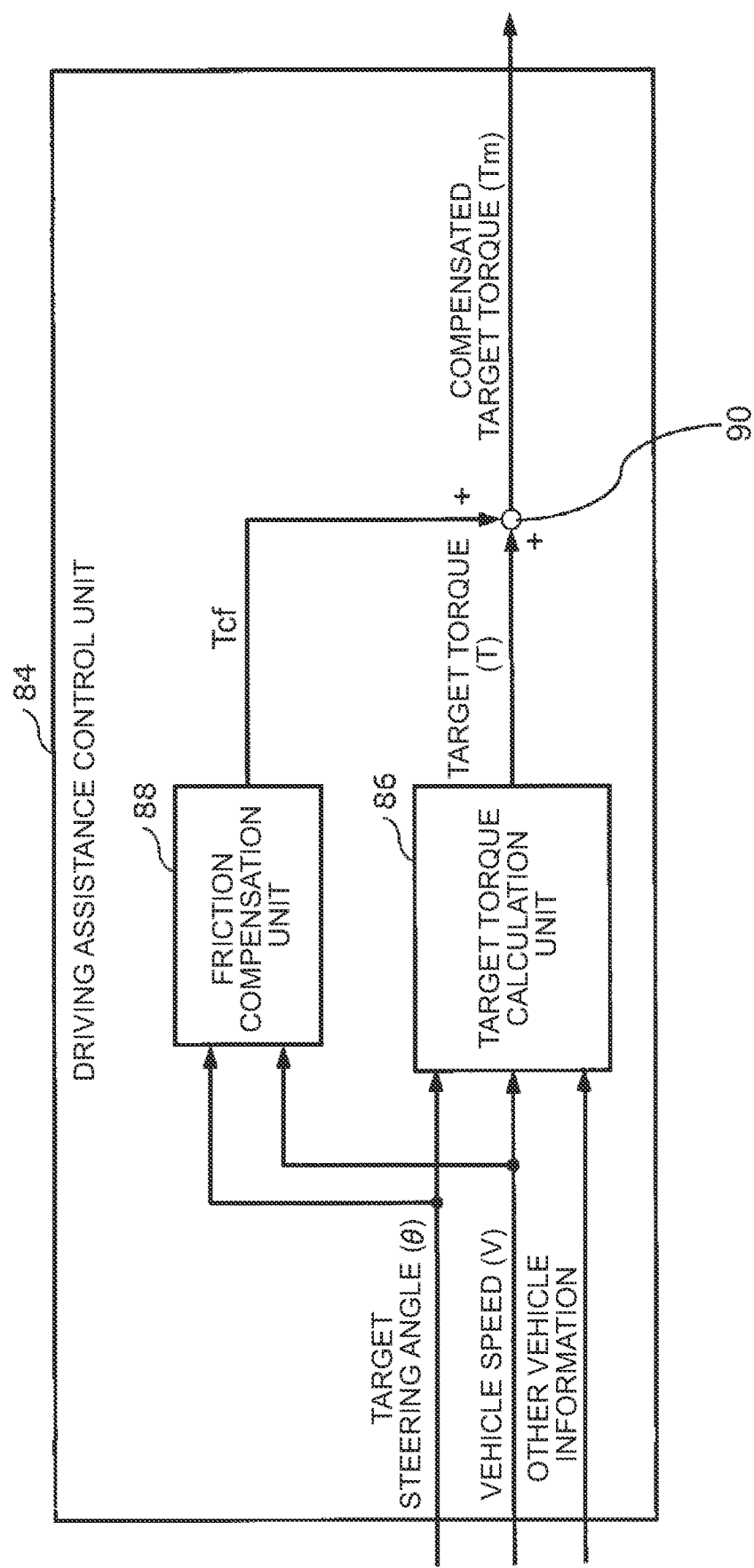
FIG. 2 is a block diagram showing a configuration of a driving assistance control unit of the electric power steering device shown in FIG. 1.

As shown in FIG. 2, the driving assistance control unit 84 includes a target torque calculation unit 86, a friction compensation unit 88, and an adder 90. The target steering angle θ required for the vehicle to travel on the center of a road sequentially set by automatic driving or driving assistance, the vehicle speed V measured by a vehicle speed sensor, and other vehicle information are input to the driving assistance control unit 84. Then, the target torque T required to move a steering rack of the steering mechanism 20 is output. The driving assistance control unit 84 includes a friction compensation unit 88 according to the present embodiment in addition to the existing target torque calculation unit 86. The target steering angle θ and the vehicle speed V are input to the friction compensation unit 88, and the friction compensation control amount Tcf (that is, the friction compensation control amount that has been processed by a low-pass filter as described below) is added to the target torque T by the adder 90 as an example of an "addition output unit", and is set as a compensated target torque Tm.

In FIG. 2, the friction compensation control amount Tcf is added to the target torque T after the target torque calculation unit 86, but a point where the friction compensation control amount Tcf is added to the target torque T is set as appropriate. Further, instead of the friction compensation control amount Tcf, the friction compensation control amount Tc that is not processed by the low-pass filter may be added to the target torque T, and set as the compensated target torque Tm. As described above, in the present embodiment, the driving assistance control unit 84, or particularly the friction compensation unit 88, constitutes an example of a "steering control device". Here, the friction compensation unit 88 will be described in more detail with reference to FIGS. 3 to 7.

Figure 3:
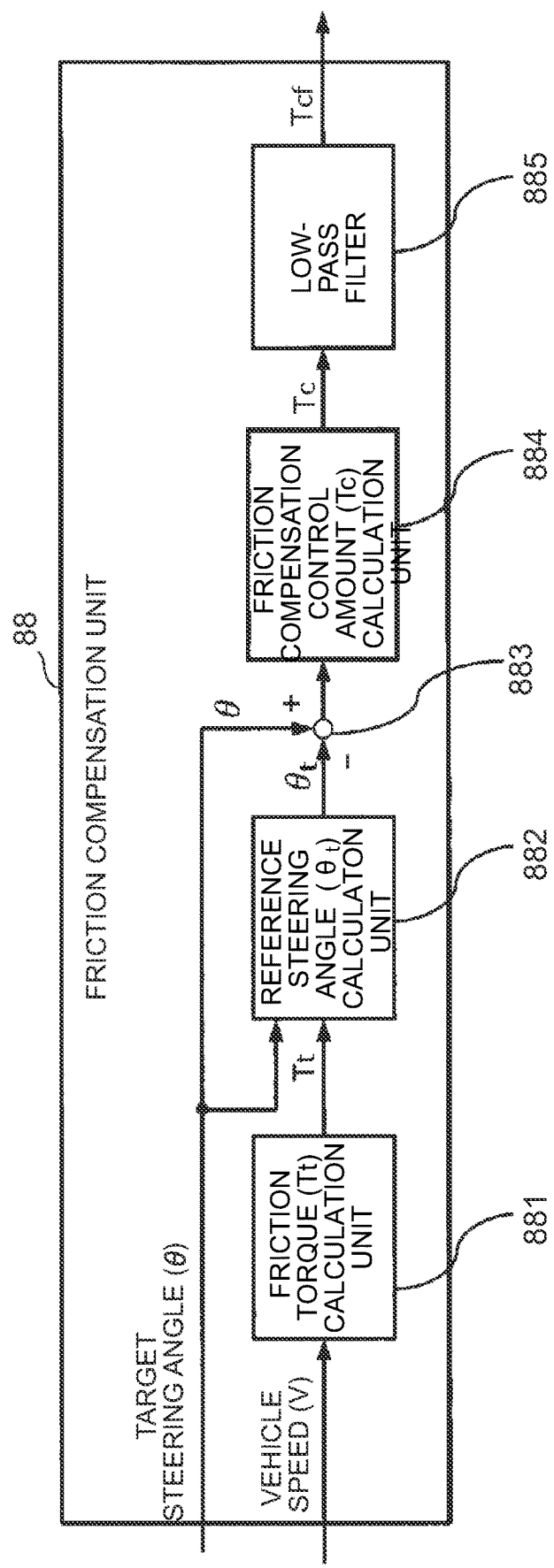
FIG. 3 is a block diagram showing a configuration of a friction compensation unit of the driving assistance control unit shown in FIG. 2.

In FIG. 3, the friction compensation unit 88 includes a friction torque calculation unit 881 that calculates friction torque Tt based on the vehicle speed V, a reference steering angle calculation unit 882 that calculates the reference steering angle $θ_t$ based on the friction torque $θ_t$ and the target steering angle θ, a subtractor 883 that subtracts the reference steering angle $θ_t$ from the target steering angle θ (that is, adds $-θ_t$ and $+θ$), a friction compensation control amount calculation unit 884 that calculates the friction compensation control amount Tc based on the subtraction result, and a low-pass filter 885 that outputs the friction compensation control amount Tcf by applying the friction compensation control amount Tc to the low-pass filter process.

Figure 4:
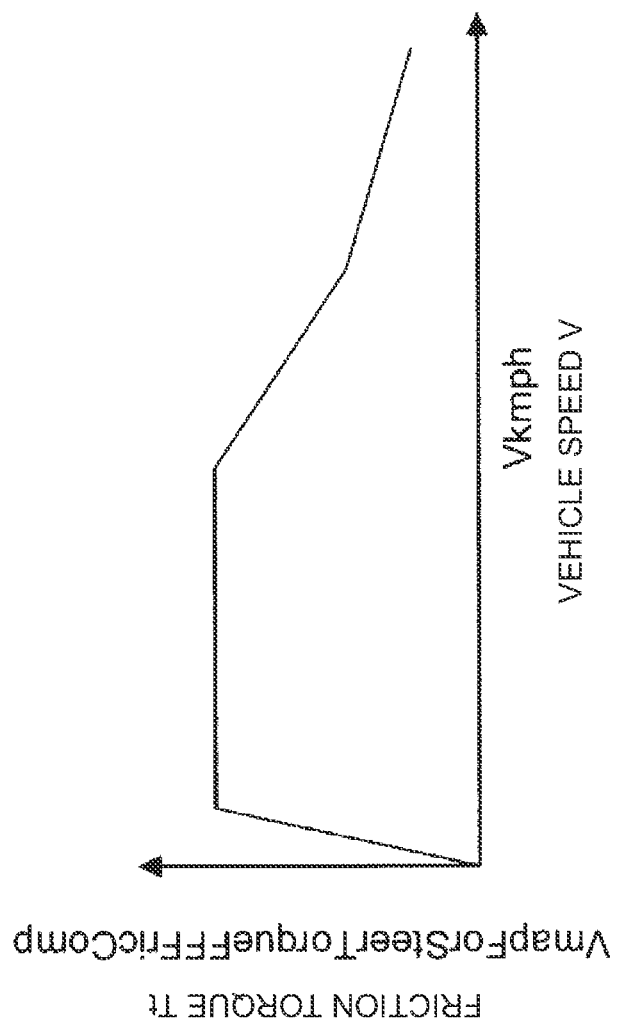
FIG. 4 is a characteristic diagram showing a relationship between a vehicle speed V and friction torque Tt in the first embodiment.

First, the friction compensation unit 88 calculates or sets the friction torque Tt to be compensated for the steering mechanism 20 (see FIG. 1) based on the vehicle speed V input from the vehicle speed sensor. Here, a preferred example of a calculation method (or setting method) for the friction torque Tt will be described with reference to FIG. 4. The friction compensation unit 88 preferably calculates the friction torque Tt using a map as shown in FIG. 4. FIG. 4 shows a curve of the friction torque Tt when the horizontal axis is the vehicle speed V and the vertical axis is the friction torque Tt, and such a map is stored in a memory of the ECU 80 and updated as appropriate. The friction torque Tt determined here is, to be exact, a physical quantity having only a magnitude, and the compensation direction (that is, the sign) thereof is determined in a later stage.

As shown in FIG. 4, when the map is used, the friction torque Tt is set smaller when the vehicle speed V is large than when the vehicle speed V is small. The reason is that the friction to be compensated can be reduced from the viewpoint of improving stability, and because the friction is reduced due to the reverse input vibration of the steering mechanism 20 at a high speed (see FIG. 1). Further, from the viewpoint of stability, the friction torque Tt may be set to zero when the vehicle speed V is zero as shown in FIG. 4.

In addition to the vehicle speed V, the target steering angle $\theta$ and the steering torque (for example, a torque sensor value output from the torque sensor 15 in FIG. 1) may be used for the friction torque calculation. At this time, when the target steering angle $\theta$ is large, the friction to be compensated may be reduced from the viewpoint of improving stability. Further, in order to suppress deterioration of the steering feeling, it is preferable to reduce the friction torque Tt when the steering torque is large.

Again, in FIG. 3, in the friction compensation unit 88, the reference steering angle $\theta_r$ is calculated or set by the reference steering angle calculation unit 882 following the above calculation process of the friction torque Tt. Here, a preferable example of the reference steering angle calculation method in the reference steering angle calculation unit 882 will be described with reference to the flowchart of FIG. 5 and the characteristic diagram of FIG. 6. The processing routine shown in FIG. 5 may be executed every predetermined calculation cycle (for example, 5 msec). Further, in FIG. 6, for the definition of positive and negative signs of the reference steering angle $\theta_r$, the left rotation direction from the neutral position (zero point) is defined as a positive direction for convenience of description.

Figure 5:
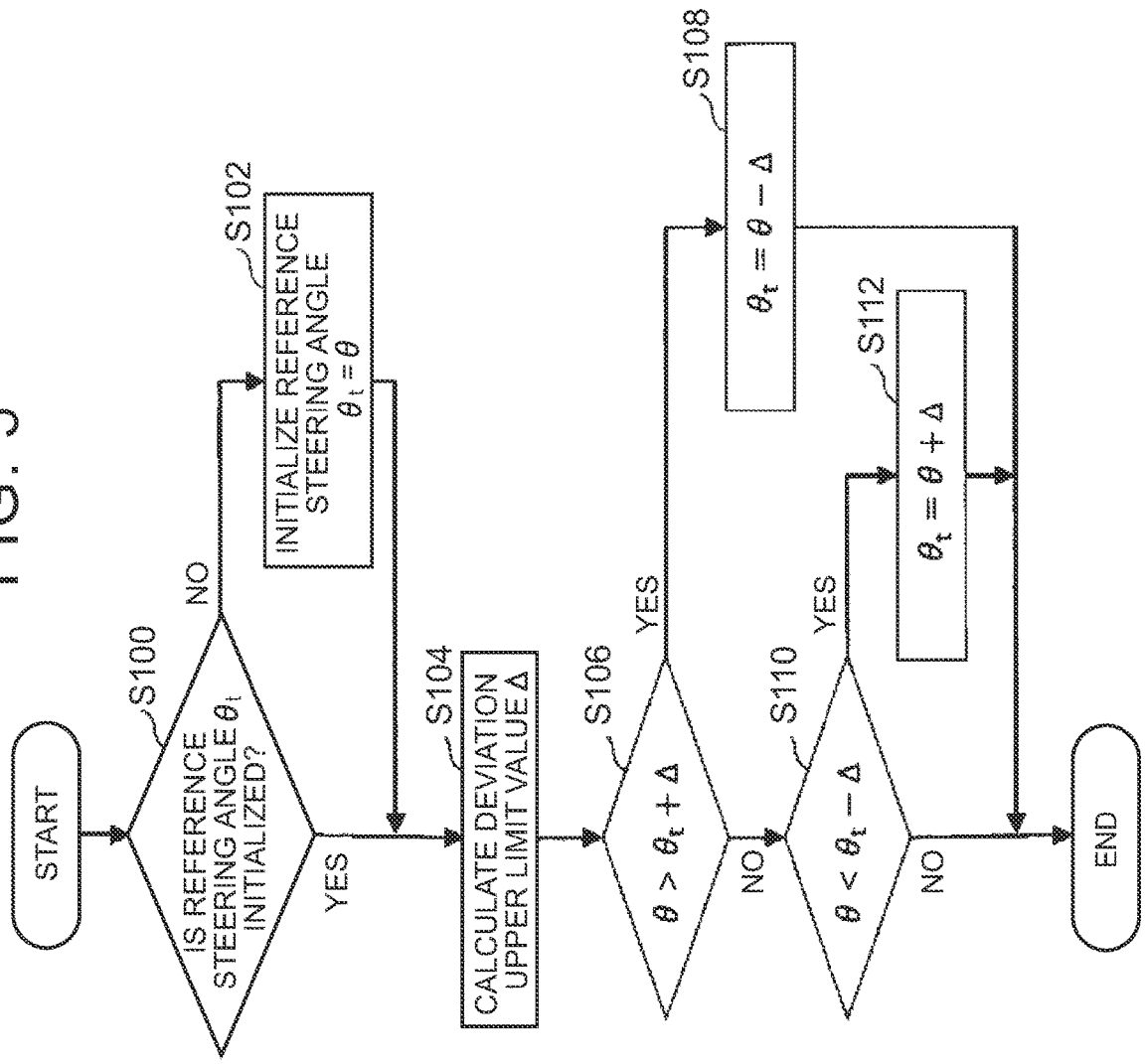
FIG. 5 is a flowchart showing a reference steering angle calculation method of steering control operation (in other words, a method of appropriately causing a reference steering angle to follow a target steering angle) in the first embodiment.

In FIG. 5, first, it is determined whether the reference steering angle $\theta_r$ is initialized, that is, whether the current cycle is a first cycle (step S100).

Here, when the reference steering angle $\theta_r$ is not initialized (step S100: No), the process proceeds to step S102, and conversely, when the current cycle is the first cycle, that is, the reference steering angle $\theta_r$ is initialized before the previous cycle (step 100: Yes), the process proceeds to step S104.

In step S102, the initial value of the reference steering angle $\theta_r$ is set to the target steering angle $\theta$ (value of the current cycle, the same applies hereinafter). That is, $\theta_r = \theta$ is set. The initial value of the reference steering angle $\theta_r$ may be zero. After step S102, the process proceeds to step S104.

In step S104, a deviation upper limit value $\Delta$, which is an example of a "predetermined value" for determining the magnitude based on the deviation between the reference steering angle $\theta_r$ and the target steering angle $\theta$ according to the present embodiment, is calculated. The deviation upper limit value $\Delta$ is calculated as $\Delta = Tt/K$ using the gain K and the friction torque Tt calculated as described above. The gain K may be any fixed value to be determined in consideration of the steering feeling and the steering angle followability. Since Tt and K are positive values, the deviation upper limit value $\Delta$ is a positive value.

Subsequently, in step S106, it is determined whether the target steering angle $\theta$, the deviation upper limit value $\Delta$ calculated in step S104, and the current reference steering angle $\theta_r$ have a relationship of $\theta > \theta_r + \Delta$. That is, it is determined whether the deviation $(\theta - \theta_r)$ between $\theta$ and $\theta_r$ is greater than the deviation upper limit value $\Delta$, in other words, whether the deviation $(\theta - \theta_r)$ is equal to or smaller than the deviation upper limit value $\Delta$. As a result of this determination, when $\theta \geq \theta_r + \Delta$ is established (step S106; Yes), the process proceeds to step S108, and conversely, when $\theta \leq \theta_r + \Delta$ is established (step S106: No), the process proceeds to step S110.

In step S108, the reference steering angle $\theta_r$ is changed to a new value by the formula $\theta_r = \theta - \Delta$ using the target steering angle $\theta$ and the deviation upper limit value $\Delta$ calculated in step S104. That is, when the deviation $\Delta\theta$ $(=\theta - \theta_r)$ obtained by subtracting the reference steering angle $\theta_r$ from the target steering angle $\theta$ is $\Delta\theta > \Delta$, the reference steering angle $\theta_r$ is changed (updated) to $\theta_r = \theta - \Delta$.

On the other hand, in step S110, it is determined whether the target steering angle $\theta$ (value of the current cycle), the deviation upper limit value $\Delta$ calculated in step S104, and the current reference steering angle $\theta_r$ have a relationship of $\theta < \theta_r - \Delta$. That is, it is determined whether the deviation $(\theta - \theta_r)$ between $\theta$ and $\theta_r$ is smaller than the deviation upper limit value $-\Delta$, in other words, whether the deviation $(\theta - \theta_r)$ is equal to or greater than the deviation upper limit value $-\Delta$. As a result of this determination, when $\theta < \theta_r - \Delta$ is established (step S110: Yes), the process proceeds to step S112.

In step S112, the reference steering angle $\theta_r$ is changed to a new value by the formula $\theta_r = \theta + \Delta$ using the target steering angle $\theta$ and the deviation upper limit value $\Delta$ calculated in step S104. That is, when the deviation $\Delta\theta$ $(=\theta - \theta_r)$ obtained by subtracting the reference steering angle $\theta_r$ from the target steering angle $\theta$ is $\Delta\theta < -\Delta$, the reference steering angle $\theta_r$ is changed (updated) to $\theta_r = \theta + \Delta$. When $\theta \geq \theta_r - \Delta$ is established in step S110 (step 110: No), the process of the current cycle ends. Therefore, in this case, the current reference steering angle $\theta_r$ is maintained unchanged. That is, when the deviation $\Delta\theta$ $(=\theta - \theta_r)$ obtained by subtracting the reference steering angle $\theta_r$ from the target steering angle $\theta$ is $-\Delta \leq \Delta\theta \leq \Delta$, the reference steering angle $\theta_r$ is maintained unchanged.

Figure 6:
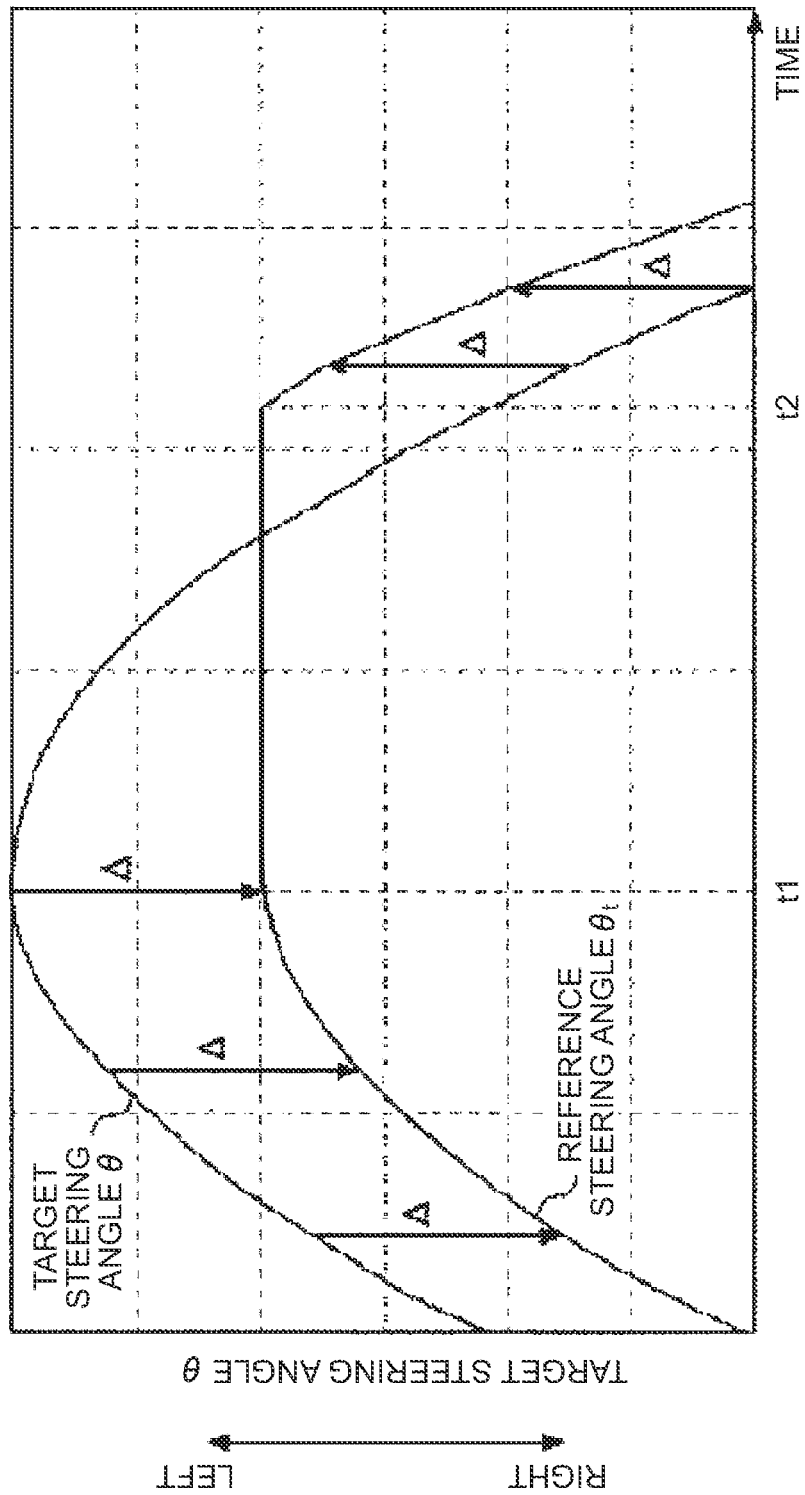
FIG. 6 is a characteristic diagram showing a state in which a reference steering angle $\theta_r$ is caused to follow a target steering angle $\theta$ in the steering control operation according to the first embodiment.

FIG. 6 is a diagram showing an example of a relationship between a change mode of the target steering angle $\theta$ and a change mode of the reference steering angle $\theta_r$ in chronological order. In the change mode of the target steering angle $\theta$ in FIG. 6, the steering wheel 11 is turned to the left until the time t1 and is returned to the right from the time t1. Accordingly, the reference steering angle $\theta_r$ has a relationship of $\theta > \theta_r + \Delta$ until the time t1, and is therefore changed by a relationship of $\theta_r = \theta - \Delta$ (see step S108 in FIG. 5). Further, the reference steering angle $\theta_r$ is maintained unchanged from the time t1 to the time t2 because a relationship of $\theta \leq \theta_r + \Delta$ and $\theta \geq \theta_r - \Delta$ is established (see step S110: No in FIG. 5). Further, the reference steering angle $\theta_r$ has a relationship of $\theta < \theta_r - \Delta$ after the time t2, and is therefore changed by a relationship of $\theta_r = \theta + \Delta$ (see step S112 in FIG. 5).

Again, in FIG. 3, in the friction compensation control amount calculation unit 884, following the calculation process of the reference steering angle $\theta_r$ described above, based on the subtraction result by the subtractor 883 for subtracting the reference steering angle $\theta_r$ from the target steering angle $\theta$, the friction compensation control amount Tc is calculated or set. For the definition of positive and negative signs of the friction compensation control amount Tc, the counterclockwise direction of the torque is defined as a positive direction.

The friction compensation control amount Tc is calculated by the formula Tc=K·$\Delta\theta$, that is the formula Tc=K($\theta$-$\theta_r$), using the target steering angle $\theta$, the reference steering angle $\theta_r$ calculated as described above, and the gain K (=Tt/$\Delta$). The gain K used here is the same as the gain K used in the above reference steering angle calculation (see step S104 in FIG. 6).

Figure 7:
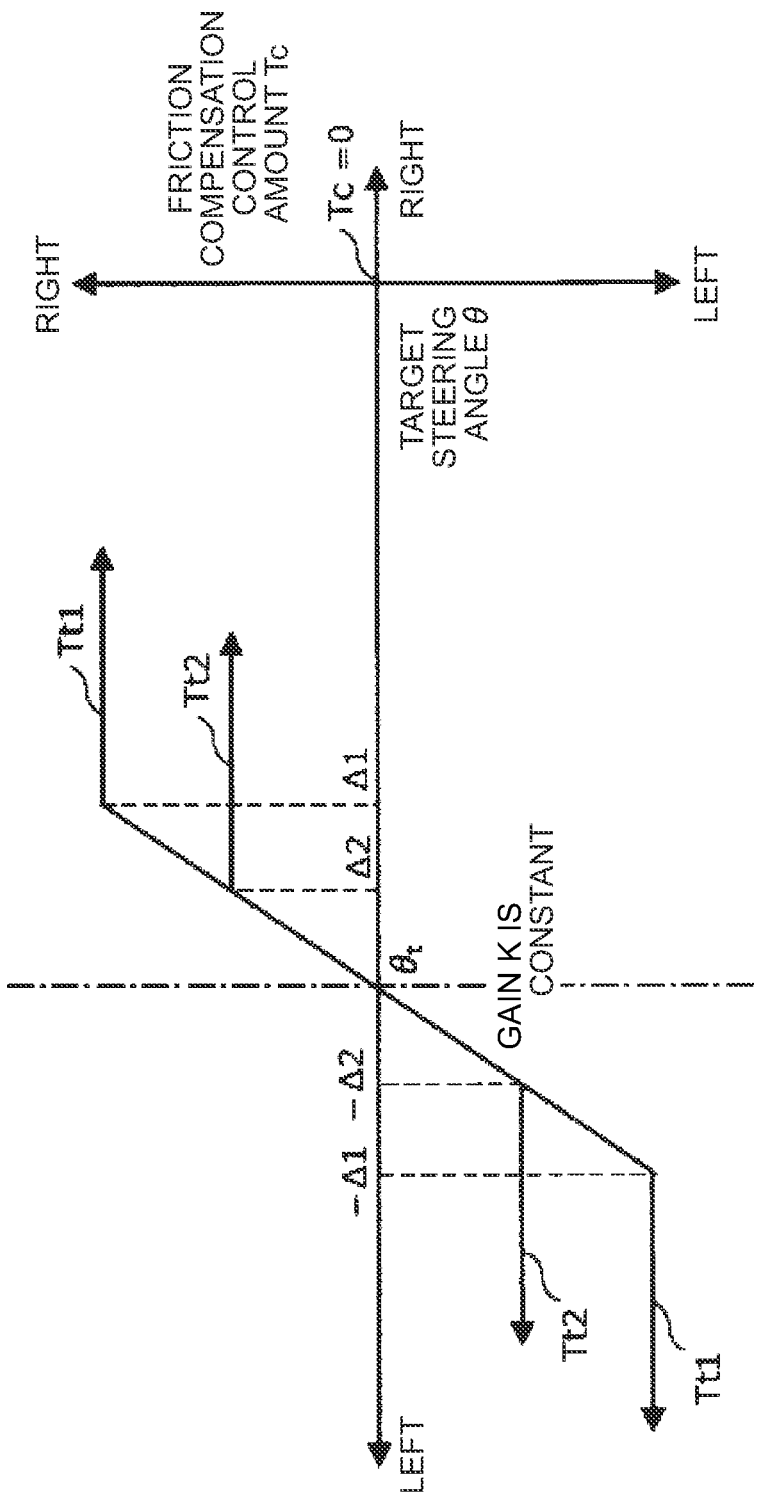
FIG. 7 is a characteristic diagram showing a friction compensation control amount Tc set with respect to the target steering angle θ in the steering control operation in the first embodiment.

Here, with reference to FIG. 7, a preferred example of a calculation method for the friction compensation control amount Tc in the friction compensation control amount calculation unit 884 will be described. FIG. 7 is an explanatory diagram of the characteristics of the friction compensation control amount Tc calculated as described above. In FIG. 7, the horizontal axis is the target steering angle $\theta$, and the vertical axis is the friction compensation control amount Tc. FIG. 7 shows, as a representative, a case where the friction torque Tt calculated as described above is Tt1 and a case where the friction torque Tt is Tt2 (<Tt1). That is, for example, FIG. 7 shows a case of the friction torque Tt1 in a low speed range V1 or a medium speed range V2 and a case of the friction torque Tt2 in a high speed range V3. Further, in FIG. 7, in both cases of Tt1 and Tt2, for convenience of facilitating the understanding, it is assumed that the reference steering angle $\theta_r$ is the same and does not change according to a change in the target steering angle $\theta$. When the reference steering angle $\theta_r$ changes, the graph only translates in the horizontal axis direction using the new reference steering angle $\theta_r$ as a center in response to the change in the reference steering angle $\theta_r$.

As shown in FIG. 7, since the deviation upper limit value $\Delta$ is $\Delta$=Tt/K, the larger the friction torque Tt, the larger the deviation upper limit value $\Delta$1 (for example, the deviation upper limit value $\Delta$1 at Tt1 is greater than the deviation upper limit value $\Delta$2 at Tt2). Further, in the range of $-\Delta \leq \Delta\theta \leq \Delta$, the reference steering angle $\theta_r$ is maintained unchanged, and from Tc=K·$\Delta\theta$, that is, Tc=K·($\theta$-$\theta_r$), the magnitude of the friction compensation control amount Tc increases in proportion to $\Delta\theta$. Then, in the range of $\Delta\theta > \Delta$ and $\Delta\theta < -\Delta$, the reference steering angle $\theta_r$ is changed as described above, and the magnitude of $\Delta\theta$ becomes a constant magnitude A. Therefore, from Tc=K·$\Delta\theta$ and $\Delta$=Tt/K, the magnitude of the friction compensation control amount Tc becomes a constant value corresponding to the magnitude of the friction torque Tt.

Again, in FIG. 3, in the low-pass filter 885, following the calculation process of the friction compensation control amount Tc described above, the friction compensation control amount Tc is preferably filtered by the low-pass filter. Here, the friction compensation control amount after being filtered is represented by the symbol Tcf. The low-pass filter may be, for example, a first-order low-pass filter as shown below, or may be in another form (for example, the order may be increased).

$$Tcf = 1/(fc \cdot s + 1) \cdot Tc$$

Here, fc is a cutoff frequency, and it is desirable that fc is a variable value such that the steering feeling and the steering angular vibration can be taken into consideration.

As described above, the filtered friction compensation control amount Tcf output from the friction compensation unit 88 is added to the target torque T output from the target torque calculation unit 86 by the adder 90, as shown in FIG. 2. Then, the compensated target torque Tm output from the driving assistance control unit 84 is applied to the steering rack of the steering mechanism 20 by an assist motor of the electric actuator 22.

As described in detail with reference to FIGS. 1 to 7, according to the first embodiment, in the friction compensation unit 88, the friction compensation control amount (Tc or Tcf) having the optimum magnitude and direction according to the vehicle speed V and the target steering angle $\theta$ is generated, so that the friction generated in the steering mechanism 20 (see FIG. 1) can be compensated. As a result, it is possible to improve the followability of the steering angle with respect to any target steering angle $\theta$ that slightly changes. In particular, as shown in FIG. 5, the reference steering angle $\theta_r$ is appropriately changed according to the deviation between the target steering angle $\theta$ and the reference steering angle $\theta_r$ (in other words, the reference steering angle $\theta_r$ is appropriately caused to follow the target steering angle $\theta$), so that it is possible to generate the friction compensation control amount that is smooth, does not cause discomfort (vibration), and is close to the actual friction characteristics. Further, as shown in FIG. 5, the reference steering angle $\theta_r$ is appropriately changed according to the deviation between the target steering angle $\theta$ and the reference steering angle $\theta_r$, so that it is possible to compensate for the friction at any steering position in addition to the neutral position (target steering angle $\theta$=0).

Next, with reference to FIGS. 8A and 8B to 11A and 11B, two simulation results indicating an example of the above effect in the first embodiment will be described. Hereinafter, a case where there is friction compensation (the present embodiment) and a case where there is no friction compensation (comparative example) indicate the presence and absence of the friction compensation unit 88 (see FIG. 2).

Figure 8A:
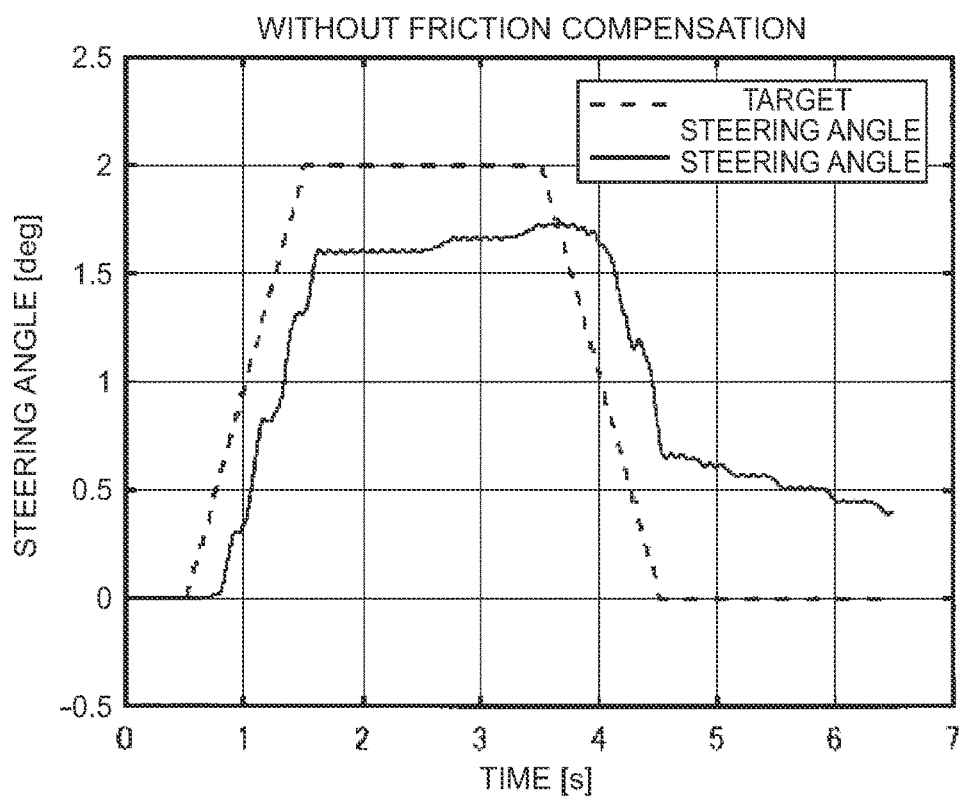
FIG. 8A is a characteristic diagram showing a time change of a target steering angle and a steering angle in a case where there is no friction compensation as a comparative example of the first embodiment.
Figure 8B:
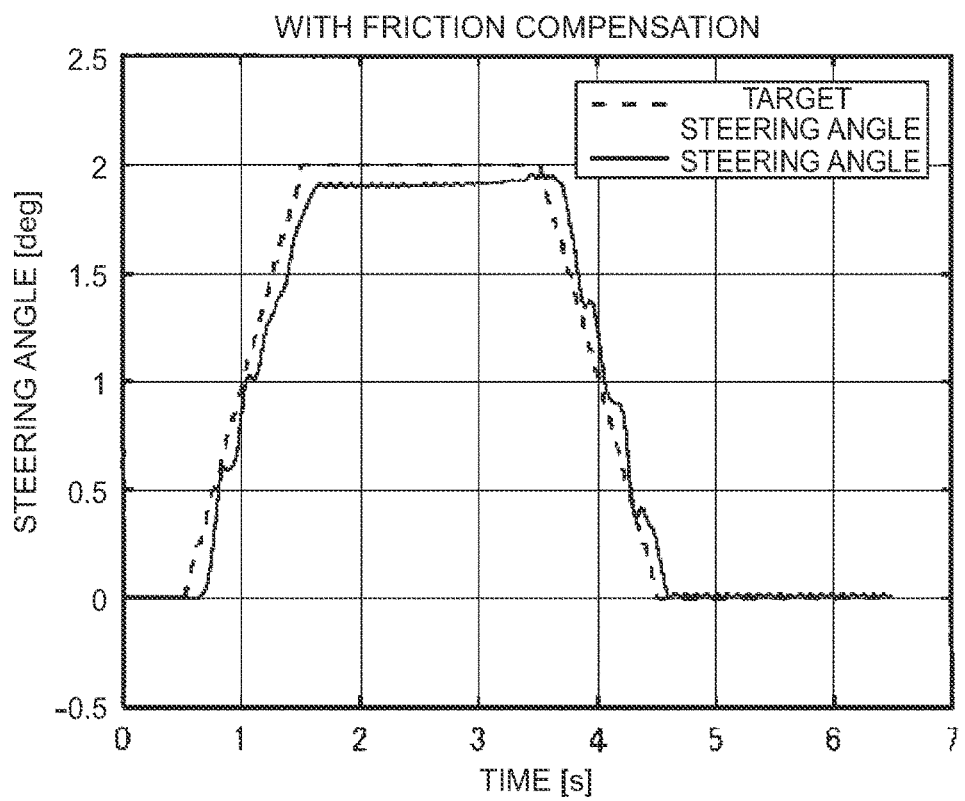
FIG. 8B is a characteristic diagram showing a time change of a target steering angle and a steering angle in a case where there is friction compensation according to the first embodiment.

FIGS. 8A and 8B show a first simulation. In FIGS. 8A and 8B, the first simulation indicates a comparison of the steering angle followability between the case where there is friction compensation (FIG. 8B: the present embodiment) and the case where there is no friction compensation (FIG. 8A: comparative example). In both cases, the vehicle speed is 40 km/h and the same waveform is input as the target steering angle. The vehicle includes the driving assistance control unit 84, calculates target torque with respect to the target steering angle, and controls the steering angle by the actuator moving the steering rack. Originally, the target steering angle changes every moment as a vehicle behavior changes, but here, the target steering angle is fixed in order to evaluate the steering angle followability alone. The broken line shows the time-series waveform of the target steering angle, and the solid line shows the time-series waveform of the steering angle. From this result, it can be seen that the steering angle followability is improved in the case where there is friction compensation as compared with the case where there is no friction compensation.

Figure 9:
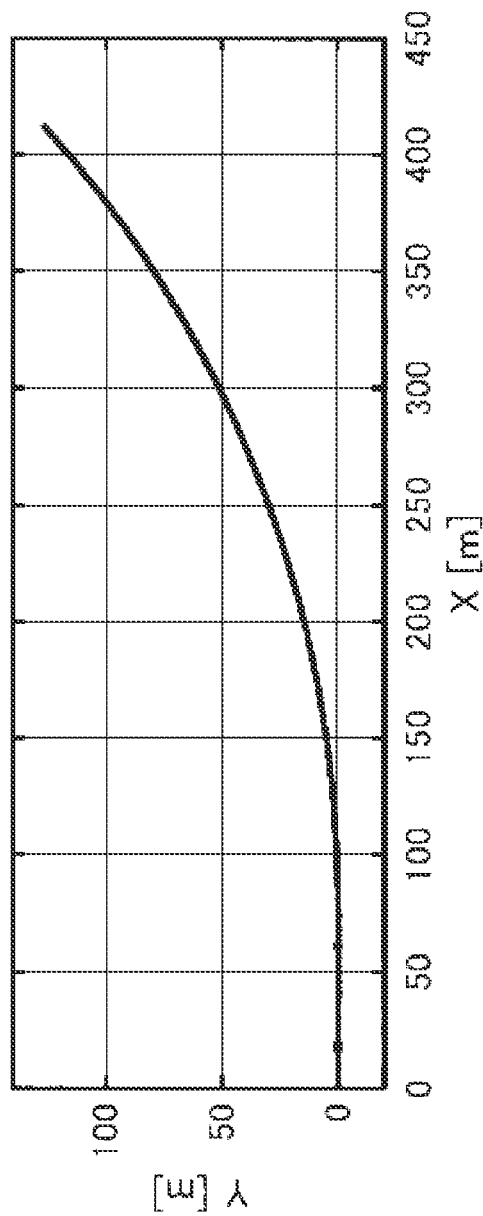
FIG. 9 is a characteristic diagram showing an example of a locus of a vehicle that curves and travels on an X-Y plane for simulation in the first embodiment.

Next, FIGS. 9 to 11A and 11B show a second simulation. In FIG. 9, unlike the first simulation described above, in the second simulation, the target steering angle changes every moment so as to be an optimum value for following a lane depending on the state of the vehicle.

FIG. 9 is a diagram showing course coordinates on which the vehicle travels according to the second simulation (that is, a plan view resembling a road map on a ground), and represents a task of entering a curve from a straight line at a vehicle speed of 80 km/h. The vehicle includes the driving assistance control unit 84, and automatically follows the course without steering by a driver.

Figure 10A:
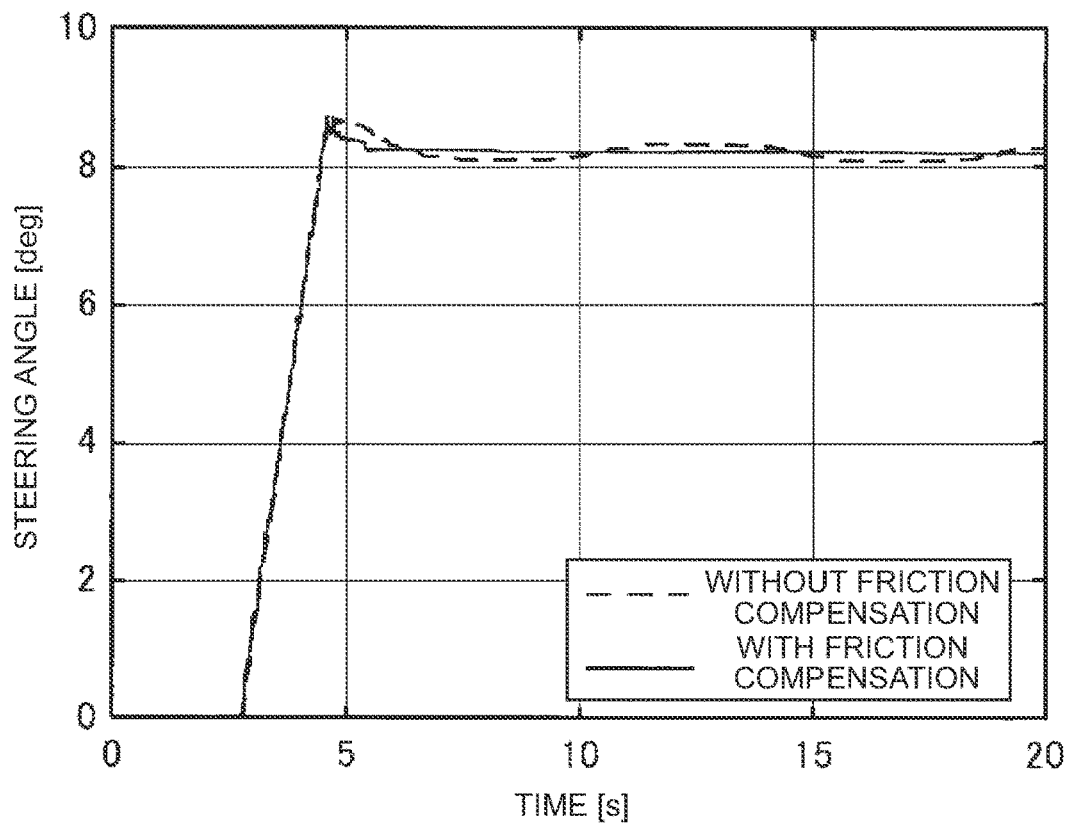
FIG. 10A is a characteristic diagram showing a time change in a steering angle in a case where there is no friction compensation and there is friction compensation according to the first embodiment as a simulation result using the example of FIG. 9.
Figure 10B:
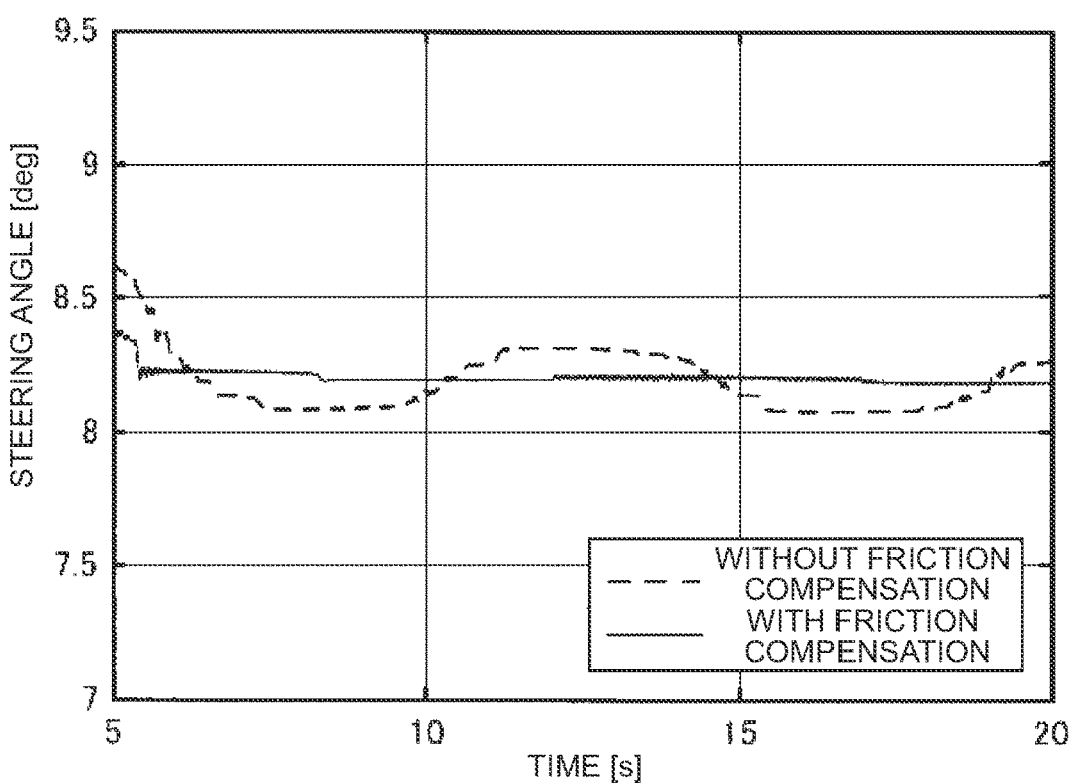
FIG. 10B is an enlarged view of the characteristic diagram showing the time change in the steering angle in a case where there is no friction compensation and there is friction compensation according to the first embodiment as the simulation result using the example of FIG. 9.

FIG. 10A shows a time-series waveform indicating a change in the steering angle, and FIG. 10B is an enlarged view showing a time period from 5 seconds to 20 seconds of FIG. 10A in order to clearly show the behavior of the vehicle during steady turning. The broken line shows a result without friction compensation, and the solid line shows a result with friction compensation. It can be seen that the waveform with friction compensation has less fluctuation in the steering angle (that is, a phenomenon in which the vehicle slightly wobbles side to side with respect to the center of the road on which the vehicle is to travel) as compared with the waveform without friction compensation. It is considered that this is because the friction of the steering mechanism can be compensated by inserting the friction compensation, and the steering angle can be finely controlled, so that the straight running stability is improved.

Figure 11A:
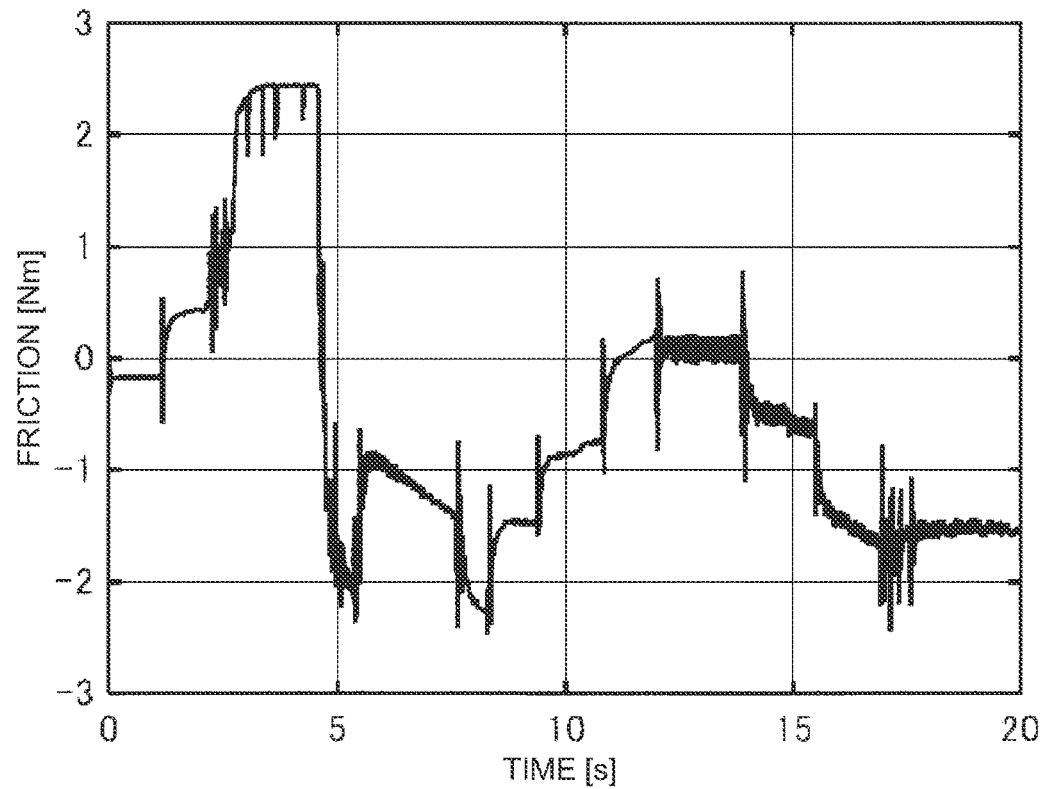
FIG. 11A is a characteristic diagram showing a time change in friction generated in a steering mechanism when there is friction compensation according to the first embodiment as a simulation result using the example of FIG. 9.
Figure 11B:
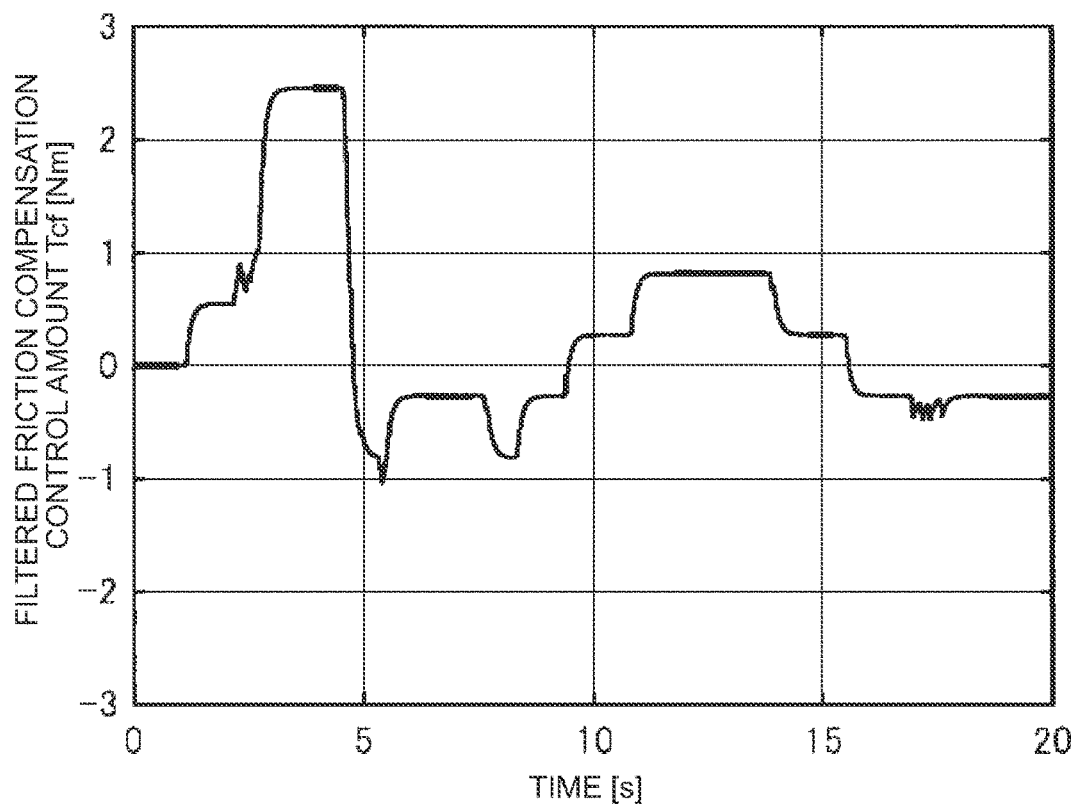
FIG. 11B is a characteristic diagram showing a time change in a friction compensation control amount Tcf in a case where there is friction compensation according to the first embodiment as a simulation result using the example of FIG. 9.

FIG. 11A shows a waveform in which the friction actually generated in the steering mechanism when there is friction compensation is calculated by a detailed friction model, and FIG. 11B shows a time-series waveform indicating a change in the friction compensation control amount Tcf at this time. From this result, it can be seen that a waveform similar to the actual friction can be generated for the friction compensation control amount Tcf. That is, according to the first embodiment, it can be seen that the friction compensation control amount Tcf in the optimum magnitude and direction can be generated with respect to the target steering angle θ.

Second Embodiment

Figure 12:
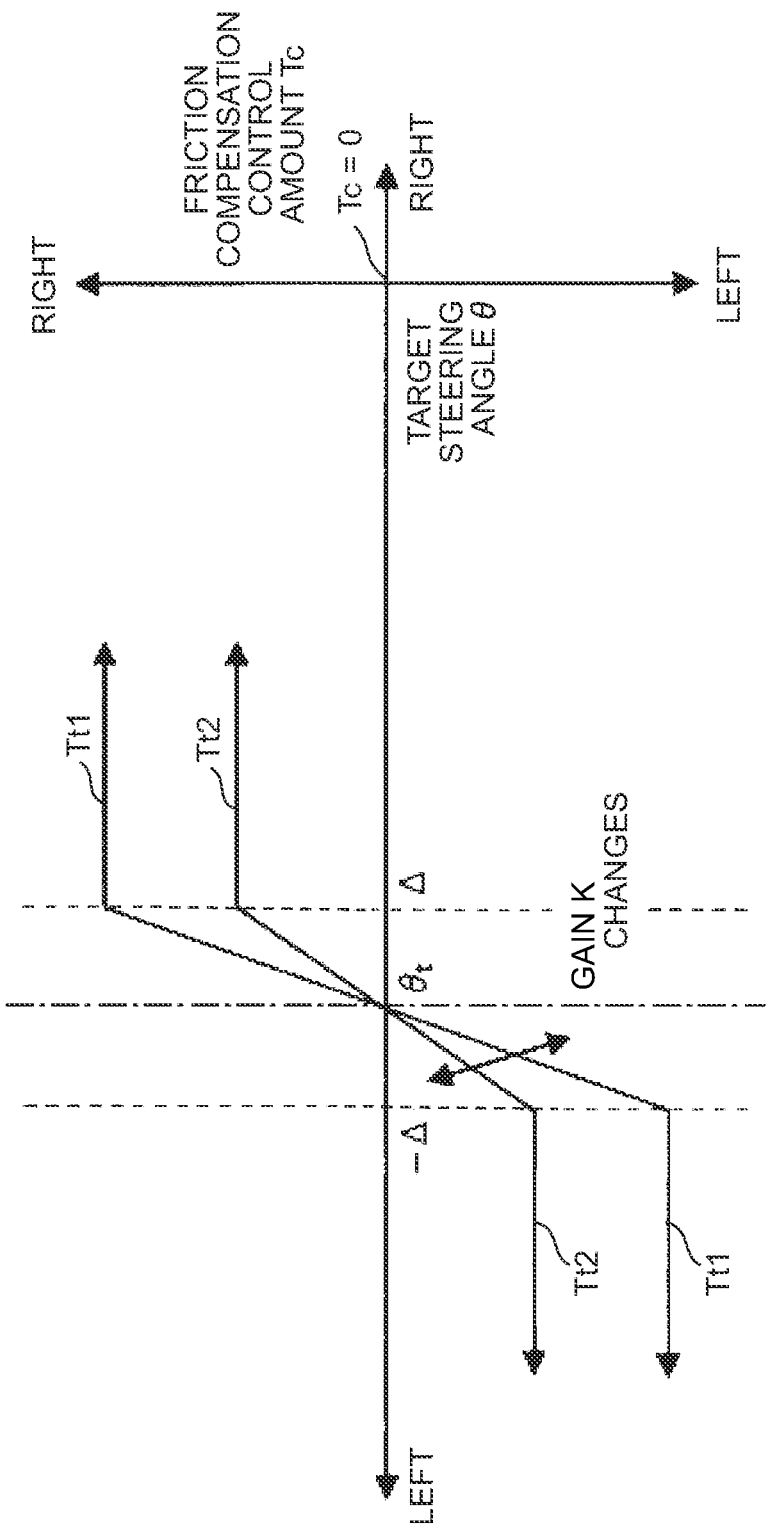
FIG. 12 is a characteristic diagram that has the same effect as that of FIG. 7 in a second embodiment.

A second embodiment of the steering control device according to the present disclosure will be described with reference to FIGS. 12 to 14. The second embodiment is the same as the first embodiment shown in FIG. 1 and the like with respect to the hardware configuration, and is different from the first embodiment mainly in the calculation of the reference steering angle $θ_r$ and the calculation of the friction compensation control amount Tc. Therefore, the second embodiment will be described below with respect to the different points, and the same reference signs will be given to the same configuration and operation processing as those of the first embodiment (see FIGS. 5 and 13), and the description thereof is omitted as appropriate.

In the second embodiment, the deviation upper limit value Δ is a fixed value, and the gain K is set to a variable value instead. FIG. 12 is a diagram showing the characteristics of the friction compensation control amount Tc realized by the second embodiment, and is a diagram corresponding to FIG. 7 of the first embodiment. In the second embodiment, as shown in FIG. 12, the deviation upper limit value Δ is a predetermined fixed value, and the gain K is varied. In the second embodiment, as in the first embodiment, a relationship between the gain K and the deviation upper limit value Δ is Δ=Tt/K. Therefore, in the second embodiment, the gain K increases as the friction torque Tt increases. As a result, in the range of $-Δ≤Δθ≤Δ$, as the friction torque Tt increases, the amount of change in the friction compensation control amount Tc with respect to the same AO increases. In the range of Δθ>Δ and Δθ<−Δ, the magnitude of the friction compensation control amount Tc becomes the magnitude of the friction torque Tt and is constant, as in the first embodiment. However, since the deviation upper limit value Δ is fixed, the range of Δθ>Δ and Δθ<−Δ is fixed regardless of the friction torque Tt, and in this range, the magnitude of the friction compensation control amount Tc becomes constant at the magnitude of the friction torque Tt.

In the second embodiment, only the calculation method of the reference steering angle $θ_r$ and the calculation method of the friction compensation control amount Tc are different from those of the first embodiment, and the calculation method of the friction torque Tt and the process of the low-pass filter may be the same. Hereinafter, only the calculation method of the reference steering angle $θ_r$ and the calculation method of the friction compensation control amount Tc in the second embodiment will be described.

Figure 13:
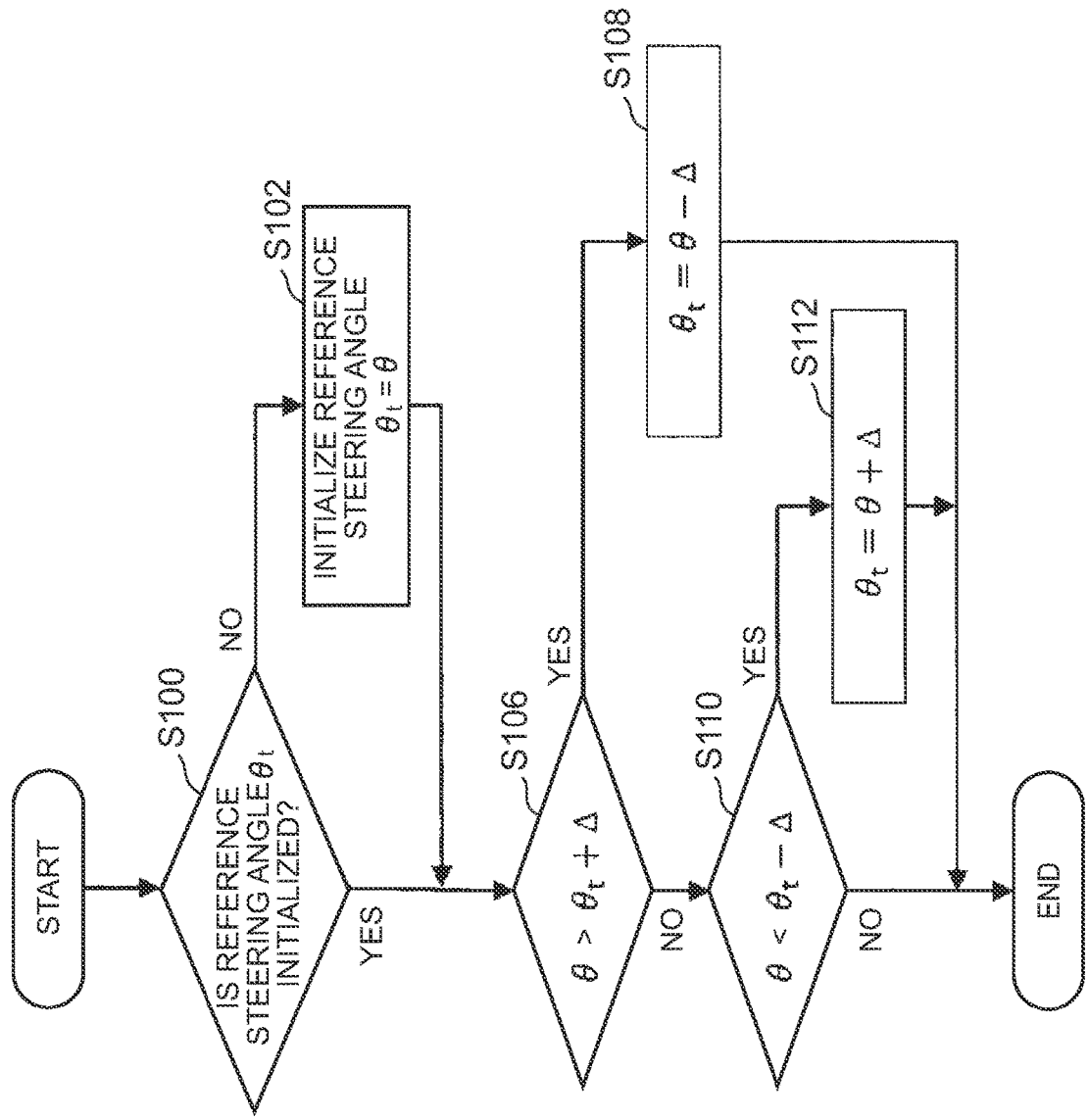
FIG. 13 is a flowchart that has the same effect as that of FIG. 5 in a second embodiment.

FIG. 13 is a flowchart showing a preferable example of the reference steering angle calculation method in the second embodiment. This reference steering angle calculation method differs from the reference steering angle calculation method in the first embodiment shown in FIG. 5 only in that the process of step S104 is not performed. That is, in the second embodiment, since the deviation upper limit value Δ is a predetermined fixed value, it is not necessary to calculate the deviation upper limit value Δ according to the friction torque Tt, and the fixed value is used as it is in step S106 and subsequent steps.

Figure 14:
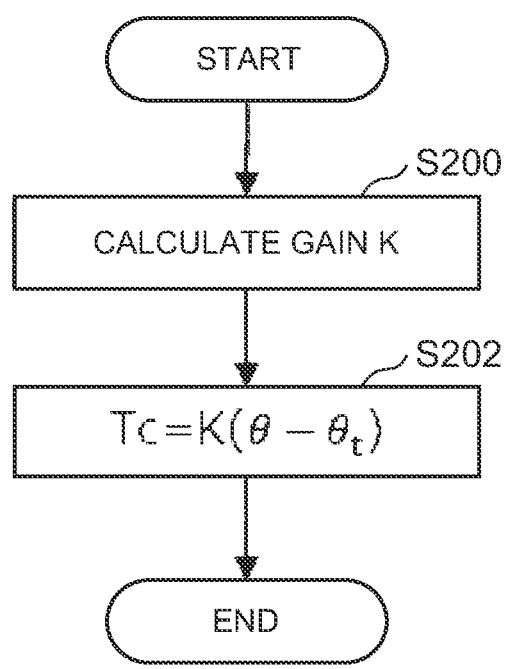
FIG. 14 is a flowchart showing an example of a calculation process of a friction compensation control amount Tc in the second embodiment.

FIG. 14 is a flowchart showing an example of the calculation process of the friction compensation control amount Tc in the second embodiment. In step S200, the gain K is calculated (set). The gain K is calculated as K=Tt/Δ using the deviation upper limit value Δ (fixed value) and the friction torque Tt calculated as described above and.

In step S202, using the target steering angle θ, the reference steering angle $θ_r$, and the gain K set in step 200, the calculation is performed by the formula Tc=K·Δθ, that is, Tc=K(θ-$θ_r$).

According to the second embodiment described above, substantially the same effect as that of the first embodiment described above can be obtained. However, in the second embodiment, when the gain K is too large, vibration is likely to occur. Therefore, it is desirable to appropriately determine the deviation upper limit value Δ such that the vibration does not occur.

Modification

In the first embodiment, the target steering angle θ necessary for following the lane is input to the driving assistance control unit 84, but lateral acceleration, yaw rate, or the like may be used as the target value. At that time, the friction compensation unit 88 can also be used in the same logic by replacing the target steering angle θ with another target value and correspondingly replacing the reference steering angle with a reference value for the other target value, and the effect thereof is the same as that of the first embodiment.

In order to improve the steering feeling, the friction torque Tt may be set to be variable by driver steering torque input via the steering wheel 11 (see FIG. 1).

As the characteristics of the steering mechanism 20 (see FIG. 1), the friction increases as the load on the steering rack increases. Therefore, the friction torque Tt is set to be variable according to the steering angle, lateral acceleration, and rack axial force. Further, in the case of a column assist electric power steering (C-EPS), the friction increases due to the torque generated by a motor, so that the friction torque may be set to be variable according to the assist amount (torque input in FIG. 1).

Although the friction waveform sufficiently close to the actual friction characteristics is obtained in the first embodiment, the friction torque Tt may be set to be variable according to the target steering angular velocity in order to further consider static friction. This makes it possible to generate the friction compensation control amount Tc in consideration of static friction, dynamic friction, and elastic friction gradient.

As described in detail above, according to the embodiment, the friction compensation unit 88 that outputs the friction compensation control amount Tc or Tcf having the appropriate direction and magnitude based on the target steering angle θ, the vehicle speed V, etc. is provided, so that the friction generated in the steering mechanism 20 during automatic driving or driving assistance is compensated, and the steering angle followability is improved. As a result, wobbling of the vehicle that travels in a straight line is reduced and disturbance responsiveness is improved.

Further, when the vehicle exerts more lateral acceleration than necessary due to momentary torque fluctuation, it is possible to suppress occurrence of inconveniences such as amplification of the vibration due to a change in the target lateral acceleration itself to be instructed, and a frequent change in the increasing and decreasing direction of the target lateral acceleration. Since the required torque smoothly decreases or increases when the increasing and decreasing direction of the target lateral acceleration is switched, the friction compensation control amount Tc or Tcf also fluctuates slightly with respect to a slight fluctuation of the target lateral acceleration. Therefore, the fluctuation range of the torque can be reduced.

APPENDIX

The following appendices will be further disclosed with respect to the embodiments described above.

Appendix 1

A steering control device described in Appendix 1 according to the present disclosure is a steering control device that controls steering of a vehicle in which automatic driving or driving assistance is performed, and includes a reference steering angle calculation unit that calculates a reference steering angle ($\theta_r$) of the vehicle based on a target steering angle (θ) and a vehicle speed (V) of the vehicle, and a compensation unit that determines whether a deviation between the calculated reference steering angle ($\theta_r$) and the target steering angle (θ) is equal to or greater than a predetermined value (Δ), and determination is made that the deviation is equal to or greater than the predetermined value (Δ), compensates for the calculated reference steering angle ($\theta_r$) such that the calculated reference steering angle ($\theta_r$) follows the target steering angle (θ).

According to the steering control device described in Appendix 1, the reference steering angle ($\theta_r$) of the vehicle is calculated by the reference steering angle calculation unit based on the target steering angle (θ) according to the direction in which the vehicle is to travel by automatic driving or driving assistance and the vehicle speed (V) of the vehicle. Subsequently, when the compensation unit first determines whether the deviation between the calculated reference steering angle (θt) and the target steering angle (θ) is equal to or greater than the predetermined value (Δ), and that the deviation is equal to or greater than the predetermined value (Δ), the calculated reference steering angle ($\theta_r$) is compensated and follows the target steering angle (θ). That is, in this case, due to compensation, the calculated reference steering angle ($\theta_r$) follows the target steering angle (θ) so as to be separated by the predetermined value (Δ) or smaller (in other words, fluctuates so as not to be separated from the target steering angle (θ) by the predetermined value (Δ) or greater). On the other hand, when the deviation is not equal to or greater than the predetermined value (Δ), the calculated reference steering angle ($\theta_r$) is not compensated, but in this case, the calculated reference steering angle ($\theta_r$) follows the target steering angle (θ) so as to be separated by the predetermined value (Δ) or smaller even without compensation.

Here, regarding the setting of the "predetermined value (Δ)", a limit value at which the fluctuation of the required torque does not adversely affect the steering feeling or the riding comfort may be obtained by experimental or empirical simulation or machine learning, and some margin may be added to the limit value. The obtained value may be set as a predetermined value in advance, or the predetermined value may be appropriately updated during automatic driving or driving assistance by machine learning. In either method, the predetermined value is set to a value small enough to keep the fluctuation of the required torque when the reference steering angle ($\theta_r$) is fluctuated toward the target steering angle (θ) within the allowable range where the required torque does not suddenly fluctuate. Further, regarding "following" by the compensation unit, a method or the like may be adopted in which the compensation unit adds, to the target torque (T) corresponding to the target steering angle (θ), the friction compensation control amount (Tc or Tcf) calculated as having the appropriate direction and magnitude based on the target steering angle and the vehicle speed. As a result, the friction torque that is the steering reaction force can be compensated, and the followability of the actual steering angle to the target steering angle (θ) can be improved. As described above, the friction generated in a steering mechanism of the vehicle is compensated and the steering angle followability is improved, so that it is possible to reduce wobbling of the vehicle traveling in a straight line and improve disturbance responsiveness.

As a result of the above, even when the increasing and decreasing direction of the target lateral acceleration is switched from the increasing direction to the decreasing direction or the decreasing direction to the increasing direction, the reference steering angle is appropriately compensated, so that it is possible to suppress sudden fluctuation in the required torque based on the compensated reference steering angle in an electric actuator that rotates the steering mechanism or supports the rotation of the steering mechanism.

Appendix 2

A steering control device described in Appendix 2 is the vehicle control device described in Appendix 1, and further includes a friction torque calculation unit that calculates a friction torque value (Tt) to be compensated for a steering mechanism of the vehicle based on a predetermined category of parameters indicating a state of the vehicle including the vehicle speed (V), in which the reference steering angle calculation unit calculates the reference steering angle ($\theta_r$) based on the calculated friction torque value (Tt) and the target steering angle (θ) in place of or in addition to the vehicle speed (V).

According to the steering control device described in Appendix 2, first, in the friction torque calculation unit, the friction torque value (Tt) to be compensated for the steering mechanism is calculated based on the predetermined category of parameters including the vehicle speed (V) (for example, in addition to the vehicle speed (V), lateral acceleration, yaw rate, driver steering torque, and the like). Next, in the reference steering angle calculation unit, the reference steering angle ($\theta_r$) is calculated based on the calculated friction torque value (Tt) and the target steering angle ($\theta$) in place of or in addition to the vehicle speed (V). Therefore, even when the increasing and decreasing direction of the target lateral acceleration is switched from the increasing direction to the decreasing direction or the decreasing direction to the increasing direction, compensation is performed while a state of the vehicle indicated by the predetermined category of parameters including the vehicle speed (V) is reflected, so that the required torque can smoothly decreases or increases. Further, since the friction compensation control amount can be set to fluctuate slightly with respect to the slight fluctuation of the target lateral acceleration, the fluctuation range of the required torque can be reduced. As described above, it is possible to more effectively suppress such sudden fluctuation in the required torque.

Appendix 3

A steering control device described in Appendix 3 is the steering control device described in Appendix 2 in which the friction torque calculation unit calculates the friction torque value (Tt) to be compensated such that a friction torque value (Tt) to be compensated when the vehicle speed (V) is a first vehicle speed value is smaller than a friction torque value to be compensated when the vehicle speed (V) is a second vehicle speed value that is smaller than the first vehicle speed value.

According to the steering control device described in Appendix 3, although the actual steering friction characteristics differ depending on the vehicle speed (V), more appropriate friction torque can be compensated according to the vehicle speed (V). For example, at a high speed, friction is reduced due to reverse input vibration of the steering mechanism, so that it is possible to take individual and specific measures according to the actual steering mechanism, such as reducing the friction compensation control amount (Tc or Tcf).

Appendix 4

A steering control device described in Appendix 4 is the steering control unit described in Appendix 2 or 3 in which, as compensation for the calculated reference steering angle, the compensation unit changes the reference steering angle ($\theta_r$) in a direction in which an absolute value of the deviation between the calculated reference steering angle ($\theta_r$) and the target steering angle ($\theta$) decreases when the absolute value of the deviation is greater than a deviation upper limit value set based on the calculated friction torque value (Tt), and does not change the reference steering angle ($\theta_r$) when the absolute value of the deviation is not greater than the deviation upper limit value.

According to the steering control device described in Appendix 4, the reference steering angle ($\theta_r$) is changed by the compensation unit in the direction in which the absolute value of the deviation between the calculated reference steering angle ($\theta_r$) and the target steering angle ($\theta$) decreases when the absolute value of the deviation is greater than the deviation upper limit value set based on the calculated friction torque value (Tt). On the contrary, when the absolute value of the deviation is not greater than the deviation upper limit value, the reference steering angle ($\theta_r$) is not changed, that is, maintained. Therefore, it is possible to compensate for the friction torque (Tt) close to the actual friction characteristics in consideration of the elastic friction gradient. That is, it is possible to suppress excessive or insufficient friction torque (Tt) to be compensated according to the actual operating condition of the steering mechanism.

Appendix 5

A steering control device described in Appendix 5 is the steering control device described in any one of Appendices 2 to 4 in which the compensation unit calculates, as the compensation for the calculated reference steering angle ($\theta_r$), a friction compensation control amount (Tc or Tcf) by multiplying the deviation between the calculated reference steering angle ($\theta_r$) and the target steering angle ($\theta$) by a gain.

According to the steering control device described in Appendix 5, the compensation unit calculates, as the compensation for the calculated reference steering angle ($\theta_r$), the friction compensation control amount (Tc or Tcf) by multiplying the deviation by the gain. Then, the calculated friction compensation control amount (Tc or Tcf) is added to the target torque (T) as it is or after other processes are performed, so that the compensated target torque (Tm) is set. As described above, the reference steering angle can be compensated as a relatively simple process.

Appendix 6

A steering control device described in Appendix 6 is the steering control device described in Appendix 5, and further includes a low-pass filter that performs a low-pass filter process on the calculated friction compensation control amount (Tc).

According to the steering control device described in Appendix 6, the friction compensation control amount (Tc) calculated as described in Appendix 6 is added to the target torque (T) after the low-pass filter process is performed (that is, as the friction compensation control amount (Tcf)), so that the compensated target torque (Tm) is set. Therefore, it is possible to improve the steering feeling with the driver's hands on the steering wheel by a relatively simple process such as giving an appropriate constant to the low-pass filter.

Appendix 7

A steering control device described in Appendix 7 is the steering control device described in Appendix 5 or 6 in which, as the compensation for the calculated reference steering angle, the compensation unit sets a deviation upper limit value ($\Delta$) by dividing the calculated friction torque value (Tt) by the gain, when a deviation ($\theta-\theta_r$) obtained by subtracting the calculated reference steering angle ($\theta t$) from the target steering angle ($\theta$) is greater than the set deviation upper limit value ($\Delta$), changes the calculated reference steering angle ($\theta_r$) to a value ($\theta-\Delta$) obtained by subtracting the set deviation upper limit value ($\Delta$) from the target steering angle ($\theta$), when the subtracted deviation ($\theta-\theta_r$) is smaller than a negative value ($-\Delta$) of the set deviation upper limit value ($\Delta$), changes the calculated reference steering angle ($\theta_r$) to a value ($\theta+\Delta$) obtained by adding the set deviation upper limit value ($\Delta$) to the target steering angle ($\theta$), and when an absolute value of the subtracted deviation ($\theta-\theta_r$) is equal to or smaller than the set deviation upper limit value ($\Delta$), maintains the calculated reference steering angle ($\theta_r$) unchanged.

According to the steering control device described in Appendix 7, it is possible to appropriately design how much the friction compensation control amount (Tc or Tcf) is increased for a slight change in the target steering angle ($\theta$) by changing the gain value. For example, by increasing the gain, the responsiveness can be improved, wobbling of the vehicle traveling in a straight line (or wobbling of the vehicle with respect to the center of a curved road) can be reduced, and responsiveness for disturbance such as a crosswind can be improved. Therefore, it is possible to compensate for the friction torque (Tt) close to the actual friction characteristics in consideration of the elastic friction gradient. That is, it is possible to suppress excessive or insufficient friction torque (Tt) to be compensated according to the actual operating condition of the steering mechanism.

Appendix 8

A steering control device described in Appendix 8 is the steering control device described in any one of Appendices 1 to 7, and further includes a target torque calculation unit that calculates target torque (T) based on the target steering angle ($\theta$) and an addition output unit that outputs compensated target torque (Tm) to an electric actuator of a steering mechanism of the vehicle by adding a friction compensation control amount (Tc or Tcf) calculated corresponding to the compensated reference steering angle ($\theta_r$) to the calculated target torque (T).

According to the steering control device described in Appendix 8, when the target torque calculation unit calculates the target torque (T) based on the target steering angle ($\theta$) or the target steering angle ($\theta$), vehicle speed (V), and the like, the friction compensation control amount (Tc or Tcf) calculated corresponding to the compensated reference steering angle ($\theta_r$) is added to the calculated target torque (T) by the addition output unit. As a result, the compensated target torque (Tm) is output to the electric actuator. Therefore, even when the increasing and decreasing direction of the target lateral acceleration is switched from the increasing direction to the decreasing direction or the decreasing direction to the increasing direction, the friction compensation control amount (Tc) follows the compensated target torque (Tm) to which the target torque (T) is added as it is or after the low-pass filter process or the like is performed, so that it is possible to suppress sudden fluctuation in the required torque of the electric actuator.

Appendix 9

An electric power steering device described in Appendix 9 is an electric power steering device, and includes the steering control device according to any one of Appendices 1 to 8 and an electric actuator of which required torque is controlled based on the compensated reference steering angle.

Since the electric power steering device described in Appendix 9 includes the steering control device according to each of the Appendices described above, it is possible to suppress sudden fluctuation in required torque of the electric actuator even when the increasing and decreasing direction of the target lateral acceleration is switched from the increasing direction to the decreasing direction or the decreasing direction to the increasing direction during automatic driving or driving assistance.

The present disclosure can be appropriately modified within the scope of the claims and within the scope not contrary to the gist or idea of the disclosure that can be read from the entire specification. The steering control device or the electric power steering device including such modifications is also included in the technical idea of the present disclosure.

What is claimed is:

1. A steering control device that controls steering of a vehicle in which automatic driving or driving assistance is performed, the steering control device comprising:
   an electronic control unit (ECU) that includes a processor configured to:
   calculate a friction torque value to be compensated for a steering mechanism of the vehicle based on a predetermined category of parameters indicating a state of the vehicle including a vehicle speed and a target steering angle, wherein the friction torque value is set to zero when the vehicle speed V is zero,
   wherein the friction torque value to be compensated when the vehicle speed is a first vehicle speed value is smaller than the friction torque value to be compensated when the vehicle speed is a second vehicle speed value that is smaller than the first vehicle speed value,
   wherein the friction torque value to be compensated when the target steering angle is a first target steering angle is smaller than the friction torque value to be compensated when the target steering angle is a second target steering angle that is larger than the first target steering angle;
   calculate a reference steering angle of the vehicle based on the target steering angle and the calculated friction torque value;
   determine whether a deviation between the calculated reference steering angle and the target steering angle is equal to or greater than a predetermined value; and
   when determination is made that the deviation is equal to or greater than the predetermined value, compensate for the calculated reference steering angle such that the calculated reference steering angle follows the target steering angle.

2. The steering control device according to claim 1, wherein, as compensation for the calculated reference steering angle, the ECU changes the reference steering angle in a direction in which an absolute value of the deviation between the calculated reference steering angle and the target steering angle decreases when the absolute value of the deviation is greater than a deviation upper limit value set based on the calculated friction torque value, and does not change the reference steering angle when the absolute value of the deviation is not greater than the deviation upper limit value.

3. The steering control device according to claim 1, wherein the ECU calculates, as the compensation for the calculated reference steering angle, a friction compensation control amount by multiplying the deviation between the calculated reference steering angle and the target steering angle by a gain.

4. The steering control device according to claim 3, further comprising a low-pass filter that performs a low-pass filter process on the calculated friction compensation control amount.

5. The steering control device according to claim 3, wherein, as the compensation for the calculated reference steering angle, the ECU:
   sets a deviation upper limit value by dividing the calculated friction torque value by the gain;

when a deviation obtained by subtracting the calculated reference steering angle from the target steering angle is greater than the set deviation upper limit value, changes the calculated reference steering angle to a value obtained by subtracting the set deviation upper limit value from the target steering angle;

when the subtracted deviation is smaller than a negative value of the set deviation upper limit value, changes the calculated reference steering angle to a value obtained by adding the set deviation upper limit value to the target steering angle; and when an absolute value of the subtracted deviation is equal to or smaller than the set deviation upper limit value, maintains the calculated reference steering angle unchanged.

6. The steering control device according to claim 1, wherein the ECU is further configured to:

calculate a target torque based on the target steering angle; and output a compensated target torque to an electric actuator of a steering mechanism of the vehicle by adding a friction compensation control amount calculated corresponding to the compensated reference steering angle to the calculated target torque.

7. An electric power steering device comprising:
the steering control device according to claim 1; and
an electric actuator of which required torque is controlled based on the compensated reference steering angle.

8. The steering control device according to claim 1, wherein the calculation of the friction torque value to be compensated is further based on a steering torque output from a torque sensor of a steering wheel of the vehicle, and the friction torque value to be compensated when the steering torque is a first steering torque is smaller than the friction torque value to be compensated when the steering torque is a second steering torque that is larger than the first steering torque.

\* \* \* \* \*